G. A. PICKENS, H. H. MARTIN & W. C. SMITH
ACETYLENE GENERATOR.
APPLICATION FILED JAN. 31, 1913.
1,196,809.
Patented Sept. 5, 1916.
2 SHEETS—SHEET 1.
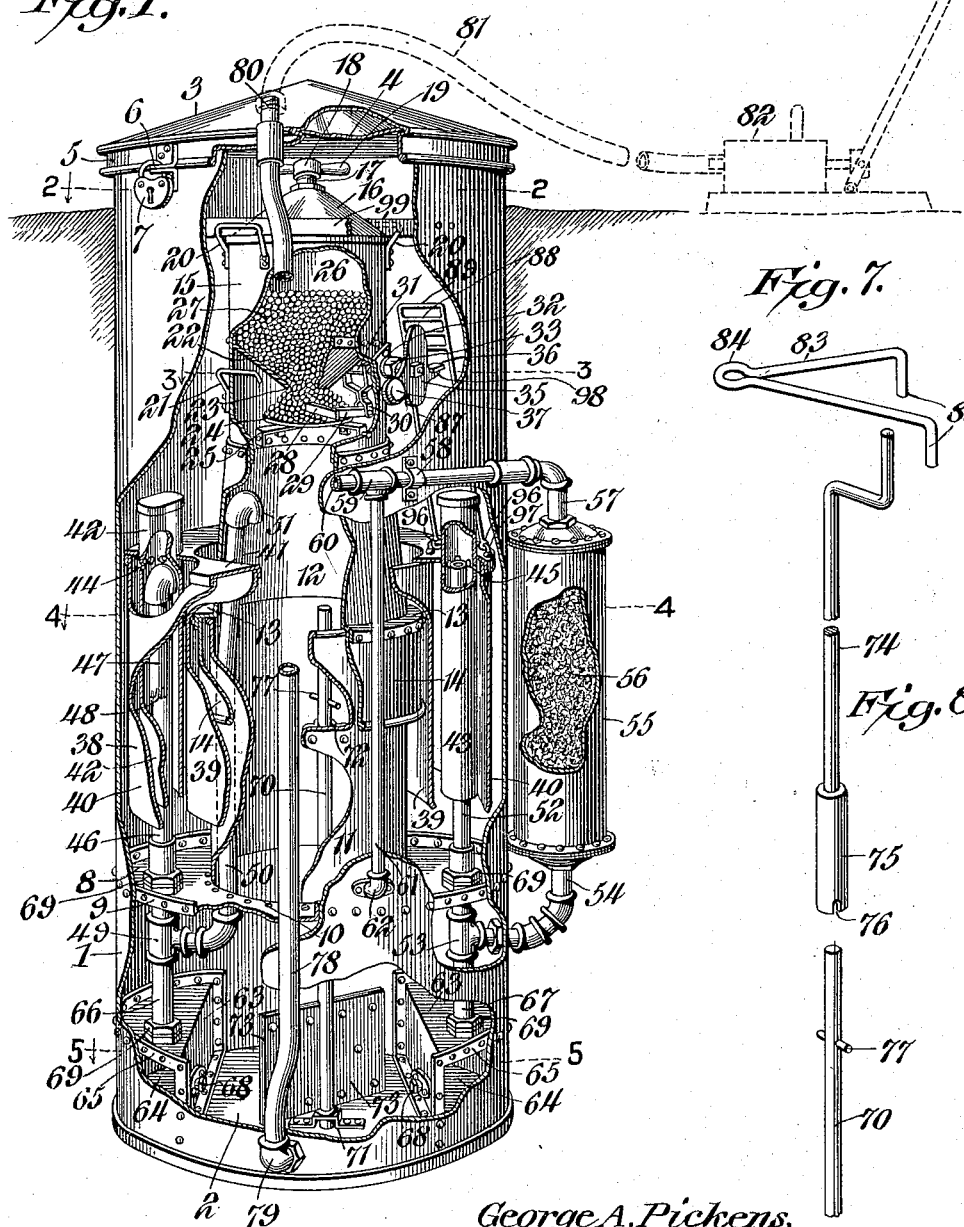
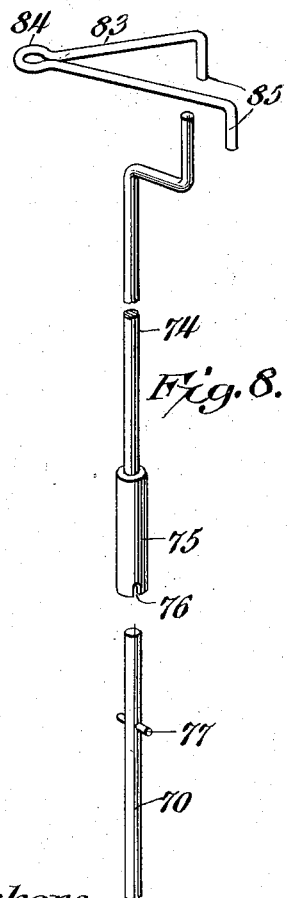
WITNESSES
Howard D. Orr.
F. T. Chapman.
George A. Pickens,
Henry H. Martin
and Wilbur C. Smith, INVENTORS,
BY
E. G. Siggers.
ATTORNEY

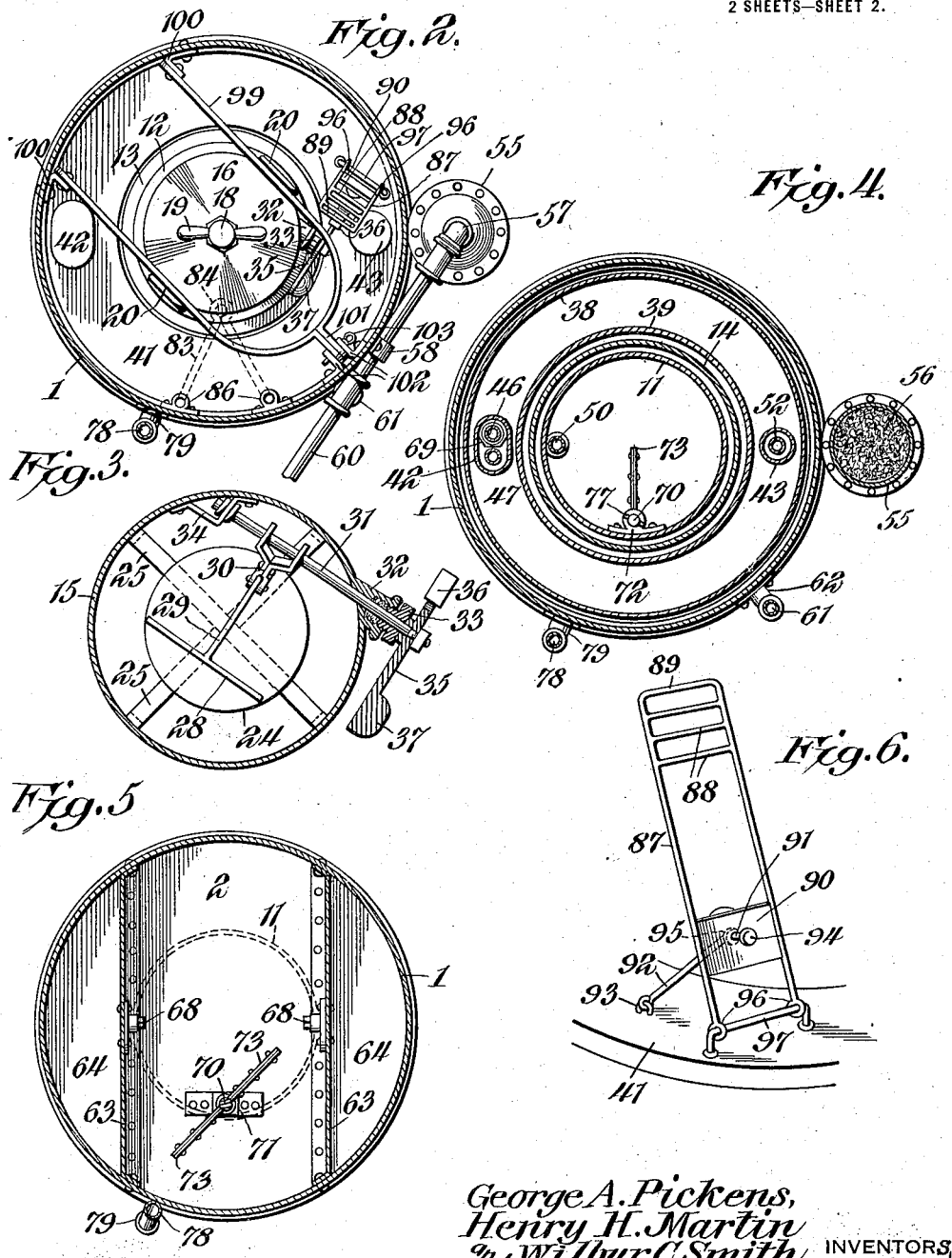

UNITED STATES PATENT OFFICE.

GEORGE A. PICKENS, HENRY H. MARTIN, AND WILBUR C. SMITH, OF MARYVILLE, MISSOURI, ASSIGNORS TO FREE LIGHT ACETYLENE GENERATOR & MFG. CO., OF MARYVILLE, MISSOURI, A CORPORATION OF MISSOURI.

ACETYLENE-GENERATOR.

1,196,809. Specification of Letters Patent. Patented Sept. 5, 1916.

Application filed January 31, 1913. Serial No. 745,447.

*To all whom it may concern:*

Be it known that we, GEORGE A. PICKENS, HENRY H. MARTIN, and WILBUR C. SMITH, citizens of the United States, residing at Maryville, in the county of Nodaway and State of Missouri, have invented a new and useful Acetylene - Generator, of which the following is a specification.

This invention has reference to improvements in acetylene generators, and is primarily designed to provide a generator which may be of large capacity and which may be buried in the ground outside of a building.

The generator of the present invention requires no pit or building, and hence may be installed at a minimum cost, and, furthermore, requires no extraneous parts, wherefore the installation may be made close to a source of water. Again, the generator is of such construction that it may be installed in low, wet ground without interference from water which would be troublesome in a pit, and the water containing part of the generator may be at such a sub-surface level as to be free from liability of freezing in cold weather.

While the generator of the present invention is designed more particularly for out of door installation, there are features of the invention which may with advantage be used in connection with the so-called basement type of generators, that is, generators designed to be installed in the basement or cellar of a building or in some equivalent location. By making the structure such that it may be buried directly in the ground the capacity of the generator is not at all limited as it would of necessity be if it were necessary to install the generator in a completed building where the size of the doorways or other openings prevents the passage of a generator beyond a certain maximum size. The capability of installation away from a building contributes very materially to the safety of the installation and of the building fed by the generator, since any escape of gas either accidentally or during the recharging of the machine is to the open air, so that there is no chance of the formation of a confined explosive mixture of gas and air.

The invention comprises numerous improvements which may be best referred to in and understood from the following detailed description, taken in connection with the accompanying drawings forming a part of this specification, with the further understanding that while the drawings illustrate a commercial form of generator embodying the present invention, such embodiment is susceptible of various changes and modifications so long as such changes and modifications mark no material departure from the salient features of the invention.

In the accompanying drawings: Figure 1 is a perspective view of the improved acetylene generator with some parts broken away to expose more distant parts to view, certain of the parts being shown in operative position and the body of water employed, to make the device operative being omitted. Fig. 2 is a section on the line 2—2 of Fig. 1. Fig. 3 is a section on a larger scale than Figs. 1 and 2 and taken on the line 3—3 through the carbid holder and feed mechanism, but with the carbid chamber omitted. Fig. 4 is a section on the line 4—4 of Fig. 1. Fig. 5 is a section on the line 5—5 of Fig. 1. Fig. 6 is a perspective view of a stirrup and support therefor used in connection with the carbid feed. Fig. 7 is a brace employed in connection with an agitator operating rod. Fig. 8 is a perspective view of the agitator operating rod and a portion of the agitator shaft in displayed relation.

Referring to the drawings there is shown an outside body or casing 1 which may be best formed as an elongated cylinder of appropriate diameter and length, made preferably of galvanized iron of an appropriately heavy gage, so as to resist both pressure and rust or other deleterious conditions. The cylindrical casing 1 is designed to be installed in the upright position and that end which constitutes the lower end is closed by a tight fitting bottom 2 secured to the body 1 by riveting or otherwise. The other end of the cylinder constituting the top end thereof is closed by a cover 3 usually of a low conical form with a bottom wall 4 and a marginal flange 5 designed to embrace the upper end of the body member 1. The cover is provided with an internal dead air chamber between its outer walls and the bottom portion 4, thus to an extent protecting the interior of the body member or casing 1 from the effects of atmospheric temperature changes. Provision is usually made by suitable ears 6 for the application of a lock 7 so that access to the interior of the generator may only be had by authorized persons, this being of importance because the generator is designed to be buried in the ground outside of any building, and hence could otherwise be entered by any one who so desired.

At the point spaced above the bottom 2 but below the mid height of the casing 1 is a web 8 provided with an outer peripheral flange 9 by means of which the web 8 may be riveted or otherwise made fast to the inner wall of the casing 1. The web 8 is of angular form and has a central passage 10 through it from which rises a cylinder or wall 11 concentric with and interior to the casing 1 and spaced from the latter a distance equal to the width of the annular web 8 between its inner and outer periphery. The wall 11 may rise to a point about coincident with the average water level within the casing 1 when the device is in operative condition. The wall 11 receives at its outer end the lower end of a frusto-conical member 12 having an outwardly extended ledge 13 formed at its lower end, which ledge rests upon the upper end of the wall 11, and from this ledge there depends a skirt 14 in surrounding relation to the corresponding portion of the wall 11. At the upper end of the frusto-conical portion 12 there is a cylindrical continuation 15 terminating in a conical cap 16 having at its apex a nipple 17 normally closed by a screw cap 18 which for convenience of manipulation may be provided with handles 19. It is not obligatory that the part 12 be frusto-conical or that the parts 12 and 15 be separately formed and secured together, but for structural reasons such arrangement is to be preferred. On opposite sides of the portion 15 are secured handles 20 and like handles 21 may be secured to the part 15 at lower points. These handles are convenient for lifting the structure composed of the parts 12, 14, 15 and 16, and for replacing these parts upon the upper end of the wall 11.

Within the portion 15 there is secured a conical or funnel shaped wall 22 contracted at the lower end and there open, as indicated at 23, and at a suitable distance below this opening 23 there is located a plate 24 of considerably greater diameter than the opening, the said plate being sustained by brackets 25 secured to the inner wall of the member 15. The space within the member 15 above the conical wall 23 constitutes a carbid chamber 26, the drawing showing a mass 27 of carbid lodged therein, this carbid being introduced through the nipple 17 whenever desirable, and such carbid will readily gravitate to the plate 24, which latter is of sufficient diameter to prevent unintentional escape of the carbid from the plate. Lodged on the plate 24, but capable of moving along the same, is a scraper blade 28 connected by an arm 29 to one end of a rock arm 30, which may be of split form, and at the end remote from the arm 29 is made fast to a rock shaft 31 extending substantially tangential to the walls of the portion 15 of the carbid holder and through a boss 32 at one side thereof, a packing gland 33 being provided for the boss, and through which the shaft 31 extends, so that gas will not escape at this point. The other end of the shaft 31 is mounted in a journal bearing 34 on the inner wall of the portion 15, while exterior to the portion 15 of the carbid carrier the shaft 31 carries a gravity arm 35 provided at one end with a lip 36 and at the other end with an enlargement 37 providing sufficient weight to tend to always move the rock shaft in one direction, but yieldable to a sufficient force applied to the lip 36 to permit the movement of the rock shaft in the other direction. The arrangement is such that when the rock shaft is moved in one direction by means to be described, the blade 28 is actuated to push some of the accumulated carbid upon the plate 24 from said plate, so that it will fall through the space below the plate in the water contained within the casing 1 and rising within the space defined by the wall 11, thus causing the generation of acetylene gas which accumulates within the space defined by the portion 12, that part of the carbid carrier 15 below the wall 22 and also within the chamber defined by the wall 11 above the level of water therein, so that the space within the portion 12 of the carbid carrier and other parts in immediate communication therewith may be termed the generating chamber.

Surrounding the wall 11 and the downward continuation or skirt of the portion 12 of the generating chamber, is a gas bell 38 comprising inner and outer walls 39, 40 connected together by an annular top member 41, the arrangement being such that the annular bell thus formed loosely fits within the space defined between the wall 11 and the casing 1 and is capable of rising and falling in said space. The lower edges of the walls 39 and 40 of the gas bell are water sealed in the water container within the casing 1 between the wall 11 and said casing and also above the web or diaphragm 8, these parts defining a water seal chamber for the gas bell with the upper level of the water as high as the top of the wall 11 if such be desirable, flow of the sealing water over the top of the wall 11 determining the height of such body of sealing water.

Carried by the top 41 of the bell 38 and preferably located on opposite sides are elongated tubular hoods 42, 43, respectively, closed at the upper ends and open at the lower ends, said lower ends being quite closely contiguous to the lower end of the gas bell, while the upper ends extend above the top 41. Closely below the top 41 the hood 42 has perforations 44 placing the interior of the hood and the interior of the gas bell in free communication and the hood 43 has a like series of perforations 45 for a like purpose.

Extending through the web or diaphragm 8 is a pipe 46 rising into the gas bell 38 and into the hood 42, and this pipe has a return portion 47 at its upper end directed toward the diaphragm 8, the hood 42 being laterally expanded to accommodate both the pipe 46 and its return portion 47, which latter may be of sufficient length to open below the level of the sealing water and the open end may also be notched, as indicated at 48. The pipe 46 is continued below the diaphragm 8 and there is provided with a T coupling 49 communicating with a pipe 50 rising interior to the wall 11 and continued upward into the generating chamber defined by the portion 12 where this pipe is provided with a return coupling 51, so that this open end is directed downwardly, although this particular arrangement is not obligatory. Rising from the diaphragm 8 is another pipe 52 which may be located diametrically opposite from the pipe 46, and this pipe extends into the hood 43 to near the closed upper end thereof where it opens freely into said hood above the level of the sealing water. The pipe 52 extends through the web or diaphragm 8 and below the same is provided with a T coupling 53 from which there extends a pipe 54 through the casing 1 and at the other end this pipe 54 is connected to a filter drum 55 filled with filtering material 56. This filter drum is entered at the lower end by the pipe 54 and at the upper end is connected to another pipe 57 held to the casing 1 by a strap 58, and from thence connected to a T 59. To this T is connected a supply or service pipe 60 which may lead to a suitable point where the acetylene gas is to be utilized. Depending from the T 59 is another pipe 61 which at a point below the level of water within the casing communicates with the interior of the generating chamber through the walls of the casing 1 by way of a coupling 62. The purpose of the pipe 61 is to divert any water of condensation which may occur in the service pipe and prevent it from reaching the filter 55, such water of condensation being conducted to the interior of the casing 1.

Separated from the water chamber below the web or diaphragm 8 by walls 63 are condensation chambers 64 which may be of segmental form leaving a considerable space between these chambers. The walls 63 are shown as comprising a horizontal portion conforming in shape to the cylindrical form of the casing and an upright portion in chord relation to the casing, and each wall has a marginal flange 65 united by rivets or otherwise to the casing 1, so that the bottom of the casing is not only braced and strengthened, but a substantially water tight joint is formed, preventing access of the water into which the carbid drops to the condensation chambers 64. One condensation chamber is entered by a pipe 66 connected to the T 49 and the other condensation chamber is entered by a pipe 67 connected to the T 53 and each condensation chamber is provided near the bottom with a plug 68 for drainage purposes. Wherever any of the pipes pass through a wall they are provided with clamp nuts 69 which may furthermore be soldered in place, thus providing a firm union, and where necessary a water tight connection.

Extending upward from the bottom 2 is an upright shaft 70 having a step bearing 71 on the bottom 2 and a strap 72 fast to the wall 11 and constituting an appropriate bearing for the shaft which rises to a point about equal to or slightly above the top of the wall 11. At the lower end above the bearing 71 the shaft carries wings or paddles 73. This shaft is accessible when the cover 3 of the generator casing has been removed and the carbid carrier has also been removed, and then by means of a crank shaft 74 provided at the lower end with a socket member 75 having terminal recesses 76 the shaft 70 may be rotated by the crank shaft with its socket end 75 applied to the upper end of the shaft 70 and the recesses 76 engaging over a through pin 77 carried by the shaft 70. The rotation of the shaft 70 is participated in by the wings 73 and the water and spent carbid in the bottom of the casing 1 is thoroughly agitated. In order to remove this water a pipe 78 communicates through a coupling 79 with the interior of the casing just above the bottom 2 and this pipe is continued to the top of the casing where it is provided with a coupling member 80 to receive a pipe 81 connected to a pump 82, the said pipe 81 and pump 82 being shown in dotted lines in Fig. 1 as indicative of any suitable means for the purpose. The pump is designed to withdraw the water and spent carbid in suspension therein when it is desired to recharge the generator, so that practically all the water into which the carbid drops may be removed from the generator. Under these circumstances should it be found necessary to remove any water of condensation from the chambers 64 an operator may be lowered into the casing and then by removing the plugs 68 drain these condensation chambers. The pipe 78 may also be used for recharging the casing with water.

Since the casing 1 may be several feet in height there is provided a steadying bracket 83 having an eye 84 through which the crank shaft 74 may extend, and the ends of this bracket are turned at an angle as indicated at 85 to seat in eyes 86 fast to the interior of the casing 1 near the upper end.

In order to operate the lever 35 a stirrup 87 is mounted upon the top 41 of the bell 38 at an appropriate point. This stirrup may be in the form of a frame of elongated rectangular shape with a suitable number of bars 88 connecting the sides and parallel with one end indicated at 89, these bars 88 and the end 89 being in position to engage the lip 36 of the lever 35. Near the other end of the stirrup frame 87 is a cross bar or plate 90 traversed by a pin 91 on one end of a rod 92, the other end of which has a pivotal connection 93 with the top 41 of the gas bell. The pin 91 terminates at the free end in a head 94 and at the other side of the cross bar 90 carries a head 95 so that between these two heads the stirrup 87 may freely play, but is otherwise supported in an inclined position by the rod 92. Those ends of the side members of the stirrup 87 remote from the end 89 are formed into eyes 96 traversed by a rod 97 mounted on the top 41, so as to form a pivotal bearing for the corresponding end of the stirrup.

When the gas bell rises the end 89 and the cross bars 88 engage a curved edge 98 of the lever 35 under the lip 36 and rock the lever if it has not already moved under its normal tendency, so that because of the freedom of movement of the stirrup on its pivot support 97 toward the head 94 the bell may rise without further operation of the lever 35, until the maximum height of rising of the bell has been reached. Now, as the bell falls by the withdrawal of gas therefrom, the bars 88 successively engage the lip 36 and rock the lever 35 in a direction to cause the blade 28 to push carbid from the plate 24, so that it will drop through the generating chamber into the water beneath the plate 24, and the falling bell will cause this operation to be repeated by the successive engagement of the bars 88 with the lip 36 and this operation may continue until so much carbid has been discharged into the water and the generated gas accumulates sufficiently to again cause the bell to rise.

In order to hold the carbid carrier against any tendency to rise because of accumulated pressure therewithin and also to position it circumferentially so that the carbid feeding devices on the carrier will properly aline with those on the gas bell, a bail 99 is pivoted to brackets 100 fast to the inner wall of the casing 1 near the upper end thereof. The bail is so shaped as to engage the cap 16 of the carbid holder on opposite sides thereof close to and between the handles 20, while the end of the bail remote from the brackets 100 is formed with an ear 101 which may be brought between spaced ears 102 on an appropriate portion of the inner wall of the casing to be traversed by a pin 103 passed through both the ear 100 and the ear 102, thus locking the bail against movement, but on withdrawing the pin 103 the bail may be swung out of the way on its pivot connections with the brackets 100 so as to offer no impediment to the ready withdrawal of the carbid holder when so desired.

The operation of the structure has been more or less touched upon in the foregoing description, but it may be briefly set forth as follows: Assuming that the casing has been properly sunk into the ground and piping connections have been properly made, the bell is under the conditions assumed in its lowermost position, which may be with the lower edge resting upon the diaphragm 8. Before the carbid carrier is placed in the casing, water is introduced through the open top, into the chamber between casing 1 and wall 11 and overflows into the generating chamber until the latter is filled to any desired level below the top of wall 11. The entrapped air in the bell readily escapes through the pipes 46 and 50 as the sealing water is poured into the sealing chamber. The carbid chamber is now placed in the casing and fastened in place by the bail 99. In this position of the parts the lever 35 is below the stirrup 87. After the carbid carrier is placed in the casing the cap 18 is removed and carbid is introduced into the carbid chamber 26 to an appropriate depth. The operator now manipulates the lever 35 very slowly to cause the discharge of enough carbid to force the air out above the water in the generating chamber, after which the cap 18 is screwed tightly in place. The operator again manipulates the lever 35 to cause the generation of gas to an extent to raise the bell, and this rising of the bell is participated in by the stirrup 87 but the rising movement of the stirrup is inactive to the lever 35, since the stirrup will readily ride away from the lever over the curved edge 98 thereof because of the play permitted by the pin 90. As soon as the bell has risen sufficiently to carry the lowermost bar 88 above the lip 36 the stirrup gravitates toward the head 95, being always at an incline in such direction as to engage the lip 36, as the bell drops on the supply of gas being used, so as to cause the blade 28 to push a quantity of carbid from the plate 24, and which carbid drops into the water within the generating chamber resulting in the generation of acetylene gas. On the dropping movement of the bell continuing, the lever 35 is released from engagement with the lowermost bar 88 and the weight 37 causes the lever to rock in the other direction, thus retracting the blade to bring it behind a fresh quantity of carbid and at the same time discharging carbid from the opposite side of the plate. Should the bell lower to a still greater extent the lever is actuated by the second bar 88 in order and a fresh quantity of carbid is pushed off the plate to generate more gas, and this may continue until the generation of gas is sufficient to again lift the bell, whereupon the stirrup will rise idly with relation to the lever in position to again actuate it on the subsequent falling of the bell. When the device is in operation and acetylene gas is being used, it is withdrawn from the gas bell through the pipe 52, filter 55 and service pipe 60 and the bell drops as described causing the operation of the lever 35 as many times as there are bars 88 brought into active contact with the lip 36. Under ordinary circumstances the rise and fall of the bell and stirrup is only sufficient to cause a single actuation of the blade 28 for each rise and subsequent fall of the bell, but where the demand is heavy the rise and fall of the bell may be more pronounced, and hence a sufficient number of bars 88 are supplied to provide for all contingencies. Whatever condensation or whatever water may reach the pipes 46 and 52 gravitates to the condensation chambers 64 and any water of condensation which may accumulate in the service pipe finds its way into the trap pipe 61. By this means the gas remains sensibly dry and the filter is effectively protected from any water of condensation.

When the carbid charge is exhausted and spent carbid or lime has accumulated in the bottom of the casing 1, the cover 3 is removed and the carbid container is released from the yoke 99, whereupon the carbid container may be lifted from the casing, after which the crank shaft 74 is applied, together with its steadying bracket 83, and the carbid reducing water with the spent carbid may be thoroughly agitated to cause the spent carbid or lime to be held in suspension by the water. Then, having connected the pump 82 the residuum and water are readily withdrawn until the casing 1 is practically emptied of water. If it be desirable to renew the sealing water, the gas bell may also be removed through the top of the casing and the water withdrawn from the sealing chamber. It is seldom necessary to remove the plugs 68, but should such an operation be found necessary an operator may be lowered into the casing to perform such office, the structure being built on sufficiently large lines to permit this. By removing the crank 74 and then renewing the water and replacing the parts as before and refilling the carbid carrier, the machine is ready for continued operation.

It will be understood, of course, that the web or diaphragm 8 may be braced and supported as necessary, since at times the water beneath it is withdrawn and it must sustain the weight of water within the sealing or gasometer chamber, that is, the chamber containing the gas bell. The hoods or sleeves 42 and 43 in conjunction with the pipes entering them act as guides for the gas bell thus at all times maintaining the stirrup in proper relation to the carbid feeding lever 35. By extending the carbid carrier down the outside of the inner wall of the gasometer chamber, so as to enter the sealing water, this carbid carrier, which is otherwise gas tight, is water sealed against the liability of escape of gas from the generating chamber, and at the same time the carbid carrier is very readily removable. The bail 99 by engaging the cap 16 between the handles 20 also serves to properly position the carbid carrier to bring the lever 35 in correct relation to the stirrup.

The removal of the carbid holder exposes to view both the generating chamber and the water seal chamber for the gas bell so that the renewal of the water is done with certainty.

What is claimed is:—

1. An acetylene generator comprising an elongated upright tubular casing provided with a cover, an annular open-top water chamber intermediate of the height of the casing, an annular gas bell in the water chamber, a carbid receptacle and a carbid feed mechanism both above the highest point of rise of the gas bell, said receptacle having a downward tubular extension below the feed mechanism and terminating in an outwardly extended ledge and a skirt pendent from the latter, with said skirt entering and the ledge loosely resting on the top of the inner wall of the water chamber and thereby supporting the carbid receptacle, and operating mechanism for the carbid feed mechanism on top of and rising above the gas bell, the carbid receptacle with its feed mechanism and the operating mechanism for said feed mechanism on the gas bell being wholly inclosed in the space above the gas bell and below the cover.

2. An acetylene generator comprising an elongated upright tubular casing having a cover, an annular gas bell in the water chamber, a carbid receptacle provided with a downward extension terminating in an outwardly extended ledge and a skirt pendent therefrom and entering the water chamber, said ledge resting loosely on the top of the inner wall of the water chamber and the downward extension sustaining the carbid receptacle at a point above the highest rise of the gas bell, coacting devices on the carbid receptacle and top of the gas bell for feeding carbid, gas conducting pipes entering the water chamber and extending upwardly into the gas bell, and perforated hoods carried by the gas bell and extending over the gas pipes and coacting with said gas pipes to prevent rotative movements of the gas bell in the water chamber to thereby maintain the feeding devices on the carbid chamber and gas bell in alined condition.

3. An acetylene generator comprising an upright tubular casing provided with a cover, an annular water chamber intermediate of the height of the casing, an annular gas bell in the water chamber, a carbid receptacle located wholly above the point of highest rise of the gas bell and wholly within the casing, the carbid receptacle and the gas bell having coacting devices for feeding carbid with the devices on the gas bell rising above the latter, a gas pipe entering the water chamber from below and rising therein to a point adjacent to the top of the gas bell and then returned upon itself to discharge below the water level in the water chamber, and a hood carried by the gas bell and telescoping over the gas pipe and its return portion, said hood being perforated for the escape of gas therefrom into the gas bell, whereby the gas pipe and hood coact to prevent rotative movements of the gas bell and thereby maintain the carbid feed mechanisms on the carbid chamber and gas bell in alined condition.

4. An acetylene generator comprising an upright tubular casing provided with a cover, a water chamber within the casing, a gas bell in the water chamber, a carbid receptacle with a downward extension loosely resting on the top of the water chamber interior to the gas bell and supporting the carbid receptacle in elevated relation to the gas bell and water chamber, carbid feed devices on the carbid receptacle, other feed devices on and rising above the gas bell for coacting with the first-named feed devices to feed carbid from the receptacle, manipulating handles fast to the receptacle at spaced points thereon, a bail pivoted to the inner wall of the casing and of a length to extend to the opposite side thereof, and fastening means for the bail at said opposite side, said bail being of a width to engage the top of the carbid receptacle in close relation to the handles thereof, whereby the bail serves to hold the carbid receptacle in place against lifting tendency of the generated gas and also serves to position the receptacle to aline the feed devices thereon with those on the gas bell.

In testimony that we claim the foregoing as our own, we have hereto affixed our signatures in the presence of two witnesses.

GEORGE A. PICKENS.
HENRY H. MARTIN.
WILBUR C. SMITH.

Witnesses:
Jos. Jackson, Jr.,
J. F. Colby.